United States Patent
Mizuno et al.

(10) Patent No.: US 11,157,891 B2
(45) Date of Patent: *Oct. 26, 2021

(54) INFORMATION DEVICE, MOBILE DEVICE, AND WEARABLE INFORMATION DEVICE

(71) Applicant: CASIO COMPUTER CO., LTD., Tokyo (JP)

(72) Inventors: Kimiyasu Mizuno, Akishima (JP); Tsuyoshi Minami, Musashimurayama (JP); Hideo Suzuki, Ome (JP); Takashi Suenaga, Tokyo (JP); Keiichi Nomura, Uenohara (JP); Shuhei Uchida, Hamura (JP); Munetaka Seo, Fussa (JP); Itsuki Yamashita, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/189,202

(22) Filed: Nov. 13, 2018

(65) Prior Publication Data

US 2019/0080314 A1    Mar. 14, 2019

Related U.S. Application Data

(63) Continuation of application No. 14/491,056, filed on Sep. 19, 2014, now Pat. No. 10,163,093.

(30) Foreign Application Priority Data

Sep. 19, 2013  (JP) ................................ 2013-194442
Apr. 1, 2014   (JP) ................................ 2014-075419

(51) Int. Cl.
*G06Q 20/32*    (2012.01)
*G06Q 20/36*    (2012.01)

(52) U.S. Cl.
CPC ...... *G06Q 20/3224* (2013.01); *G06Q 20/3674* (2013.01)

(58) Field of Classification Search
CPC .......................... G06Q 20/32; G06Q 20/3224
(Continued)

(56) References Cited

U.S. PATENT DOCUMENTS

2006/0117017 A1   6/2006  Kawaguchi et al.
2012/0072350 A1*  3/2012  Goldthwaite ........ G06K 7/0004
                                              705/44
(Continued)

FOREIGN PATENT DOCUMENTS

CN    1319980 A    10/2001
CN    1732703 A     2/2006
(Continued)

OTHER PUBLICATIONS

Notice of Allowance dated Aug. 14, 2018 received in related U.S. Appl. No. 14/491,056.
(Continued)

*Primary Examiner* — Alexander G Kalinowski
*Assistant Examiner* — Liz P Nguyen
(74) *Attorney, Agent, or Firm* — Scully Scott Murphy & Presser

(57) ABSTRACT

An information device makes a payment with a payment terminal through a contactless communication, using amount data of an electronic purse function of a mobile device. The mobile device with the electronic purse function permits the information device to be used for performing payment processing with the payment terminal, using amount data of the electronic purse function of the mobile device. A wearable information device includes an image taking unit configured to take an image of an object in the direction of line of vision of a user, and notifies the infor-
(Continued)

mation device of the presence or absence of the information device in a taken image. The information device makes a payment with the payment terminal through a contactless communication based on the notification from the wearable information device of the presence or absence of the information device.

11 Claims, 10 Drawing Sheets

(58) Field of Classification Search
USPC .......................................................... 705/41
See application file for complete search history.

(56) References Cited

U.S. PATENT DOCUMENTS

| | | | | |
|---|---|---|---|---|
| 2014/0089572 A1* | 3/2014 | Koka | ................. | G06F 12/1072 711/105 |
| 2014/0089672 A1* | 3/2014 | Luna | ................... | H04L 9/3231 713/186 |

FOREIGN PATENT DOCUMENTS

| | | |
|---|---|---|
| CN | 202795232 U | 3/2013 |
| EP | 1 098 271 A1 | 9/2001 |
| JP | H10-228515 A | 8/1998 |
| JP | 2000-099609 A | 4/2000 |
| JP | 2001-273528 A | 10/2001 |
| JP | 2002-015262 A | 1/2002 |
| JP | 2002-197421 A | 7/2002 |
| JP | 2007-172656 A | 7/2007 |
| JP | 2007-195028 A | 8/2007 |
| JP | 2008-186297 A | 8/2008 |
| JP | 2009-048488 A | 3/2009 |
| JP | 2012-205251 A | 10/2012 |
| WO | 2013/079609 A1 | 6/2013 |

OTHER PUBLICATIONS

Office Action dated Apr. 30, 2018 received in related U.S. Appl. No. 14/491,056.
Notification of Reasons for Refusal dated Jul. 18, 2017 received in Japanese Patent Application No. JP 2016-105790 together with an English language translation.
First Office Action dated Jul. 24, 2017 received in Chinese Patent Application No. CN 201510133686.6 together with an English language translation.
Office Action dated Sep. 12, 2017 received in related U.S. Appl. No. 14/491,056.
Office Action dated Aug. 18, 2015 received in Japanese Patent Application No. JP 2013-194442.
Notification of Reasons for Refusal dated Apr. 11, 2017 received in Japanese Patent Application No. JP 2016-105790 together with an English language translation.
First Office Action dated May 2, 2017 received in Chinese Patent Application No. CN 201410484528.0 together with an English language translation.
Notice of Reasons for Refusal dated Nov. 10, 2020 received in Japanese Patent Application No. JP 2019-141413 together with an English language translation.

* cited by examiner

INFORMATION DEVICE, MOBILE DEVICE, AND WEARABLE INFORMATION DEVICE

CROSS-REFERENCE TO RELATED APPLICATIONS

This application is a continuation application of U.S. patent application Ser. No. 14/491,056, filed on Sep. 19, 2014, which is claims priority to Japanese Patent Application No. 2013-194442, filed on Sep. 19, 2013, and Japanese Patent Application No. 2014-075419, filed on Apr. 1, 2014, the entire contents of all of which are incorporated herein by reference.

FIELD

The present invention relates to a technique of using an electronic purse function and to a technique of preventing skimming at usage of the electronic purse function.

BACKGROUND

There are generally known mobile phones and smartphones (mobile devices) which are each equipped with an electronic purse function, store data of an electronic purse, and make an electronic payment using proximity contactless communication (hereinafter referred to as contactless communication) such as NFC (Near Field Communication) with an automatic ticket gate, for example, as a payment terminal (refer to Japanese Patent Application Laid-Open Publication No. 2001-273528, for example).

In the technique disclosed in Japanese Patent Application Laid-Open Publication No. 2001-273528, a user of a mobile phone performs contactless communication between the mobile phone and an automatic ticket gate when going out of a station through the automatic ticket gate, so that an electronic payment is made via the automatic ticket gate. At the payment, an amount for a fare is withdrawn from the data of an electronic purse stored in the mobile phone.

Recently, smartphones have been rapidly diffused as replacements of mobile phones, and accordingly, electronic payments are often made by contactless communication using the electronic purse function of the smartphones.

Further, with the recent popularization of the smartphones, attention is being focused on an information device in the shape of a watch (hereinafter referred to as a wrist information device) which operates in cooperation with a smartphone.

SUMMARY

According to a first aspect of the present invention, there is provided a wearable information device comprising: a wearable information device-side processor configured to: control a wearable information device-side wireless communication interface to receive information about an amount of money from a mobile device, and control a memory to store the information about the amount of money received; control the wearable information device-side wireless communication interface to perform a communication with a payment terminal and update the information about the amount of money stored in the memory to perform payment processing; control the wearable information device-side wireless communication interface to transmit the information about the amount of money stored in the memory that has been updated to the mobile device; and after controlling the wearable information device-side wireless communication interface to transmit the information about the amount of money stored in the memory that has been updated to the mobile device, control the memory so that the information about the amount of money stored in the memory that has been updated cannot be used to perform another payment processing.

According to a second aspect of the present invention, there is provided a system comprising: the wearable information device; and the mobile device.

According to a third aspect of the present invention, there is provided a method for operating a wearable device, the method comprising: controlling a wearable information device-side wireless communication interface to receive information about an amount of money from a mobile device, and controlling a memory to store the information about the amount of money received; controlling the wearable information device-side wireless communication interface to perform a communication with a payment terminal and updating the information about the amount of money stored in the memory to perform payment processing; controlling the wearable information device-side wireless communication interface to transmit the information about the amount of money stored in the memory that has been updated to the mobile device; and after controlling the wearable information device-side wireless communication interface to transmit the information about the amount of money stored in the memory that has been updated to the mobile device, controlling the memory so that the information about the amount of money stored in the memory that has been updated cannot be used to perform another payment processing.

According to a fourth aspect of the present invention, there is provided a computer-readable storage device storing instructions for operating a wearable device, wherein the instructions cause a computer to at least perform: controlling a wearable information device-side wireless communication interface to receive information about an amount of money from a mobile device, and controlling a memory to store the information about the amount of money received; controlling the wearable information device-side wireless communication interface to perform a communication with a payment terminal and updating the information about the amount of money stored in the memory to perform payment processing; controlling the wearable information device-side wireless communication interface to transmit the information about the amount of money stored in the memory that has been updated to the mobile device; and after controlling the wearable information device-side wireless communication interface to transmit the information about the amount of money stored in the memory that has been updated to the mobile device, controlling the memory so that the information about the amount of money stored in the memory that has been updated cannot be used to perform another payment processing.

DETAILED DESCRIPTION OF THE PREFERRED EMBODIMENTS

Embodiments for implementing the present invention will be hereinafter described in detail with reference to the drawings.

[Electronic Payment]

First Embodiment

Figure 1:
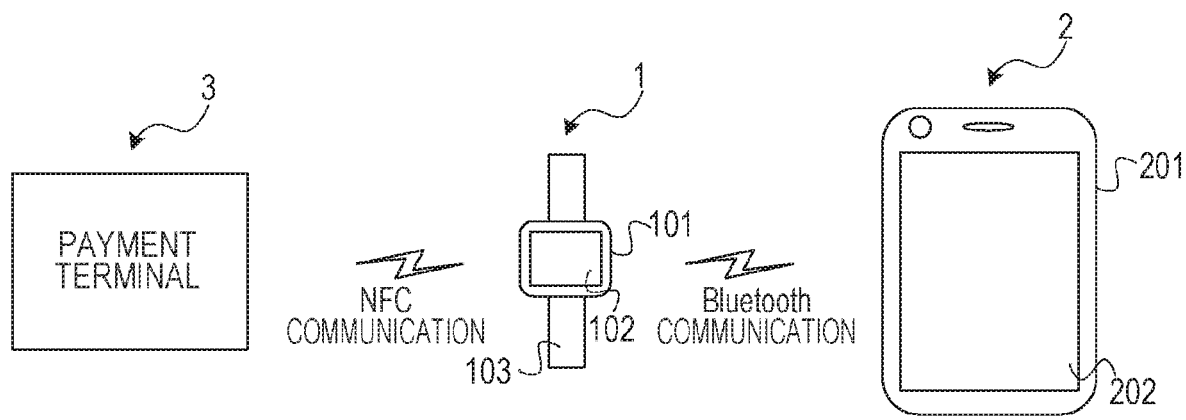
FIG. 1 is a configuration diagram illustrating an electronic payment system according to a first embodiment.

FIG. 1 is a configuration diagram illustrating an electronic payment system according to a first embodiment of the present invention. The system according to the first embodiment is formed of a wrist information device 1 and a smartphone 2 capable of data exchange between each other via Bluetooth (registered trademark), and a payment terminal 3 that makes payment of data of an electronic purse held by an electronic purse function of the smartphone 2.

The wrist information device 1 has a shape of a watch so that a user can wear the wrist information device 1 on a wrist, and includes a watch case 101, a display section 102 on the watch case 101 functioning as a touch panel, and a wrist band 103 attached to each side of the watch case 101.

The wrist information device 1 is capable of data exchange with the smartphone 2 via Bluetooth, and performs data communication with the payment terminal 3 by contactless communication using the NFC technology. The details thereof will be described later.

As is well known, the smartphone 2 includes a vertically-long device body 201 and a display section 202 on the device body 201 functioning as a touch panel, and is connectable to the Internet by wireless communication.

Further, the smartphone 2 exchanges data with the wrist information device 1 via Bluetooth and can exchange data with the payment terminal 3 by contactless communication using the NFC technology. The details thereof will be described later.

The payment terminal 3, which is an automatic traffic ticket gate, for example, makes payment of a fare, etc. by contactless communication using the NFC technology with the wrist information device 1 or the smartphone 2.

Figure 2:
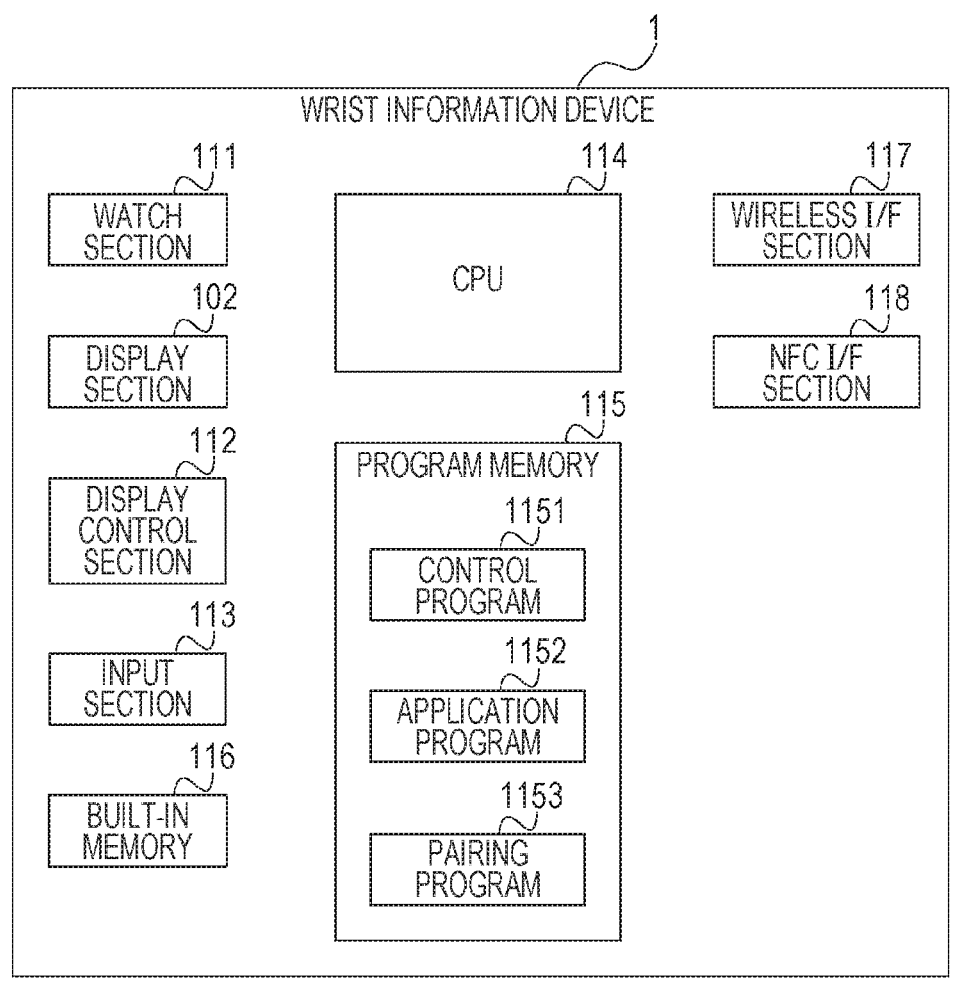
FIG. 2 is a block diagram illustrating a wrist information device (information device)

FIG. 2 is a schematic block diagram illustrating a circuit configuration of the wrist information device 1. Reference number 111 denotes a watch section, which counts the current time. Reference number 102 denotes the display section, which is formed of a color LCD (Liquid Crystal Display) and a driving circuit for driving the color LCD, for example. Reference number 112 denotes a display control section, which controls a display state of the display section 102. Reference number 113 denotes an input section, which is formed of various types of switches not shown in FIG. 1. The input section 113 further includes a touch sensor over a surface of the color LCD of the display section 102, and a driving circuit for driving the touch sensor, the touch sensor allowing the display section 102 to function as a touch panel.

Reference number 114 denotes a CPU (Central Processing Unit), which controls the entire functions of the wrist information device 1. Reference number 115 denotes a program memory, in which a control program 1151, an application program 1152, and a pairing program 1153 are stored in advance.

The control program 1151 is a basic control program for allowing the CPU 114 to control the entire functions of the wrist information device 1. The application program 1152 is formed of application programs for allowing the CPU 114 to carry out various types of processing including processing described later. The pairing program 1153 is a program for performing pairing (setting of connection) with the smartphone 2, for example.

Reference number 116 denotes a built-in memory such as a flash memory, which stores various types of settings information used for determining the operational contents of the wrist information device 1, and data of an electronic purse acquired from the smartphone 2 via Bluetooth, for example.

Reference number 117 denotes a wireless I/F section, which executes receiving and transmitting with respect to the smartphone 2 via Bluetooth. Reference number 118 denotes an NFC I/F section including a loop antenna and a receiving/transmitting circuit, which performs data communication for the electronic purse by contactless communication using the NFC technology with the payment terminal 3.

Figure 3:
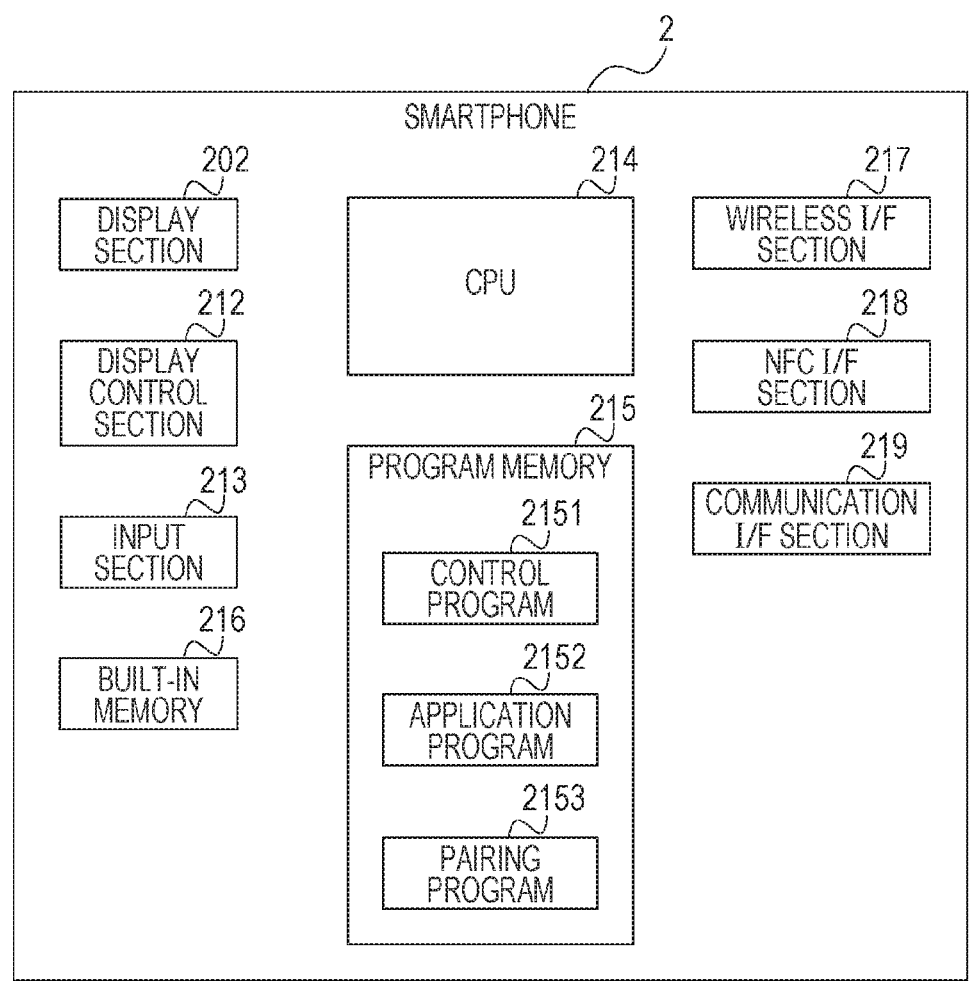
FIG. 3 is a block diagram illustrating a smartphone (mobile device)

FIG. 3 is a schematic block diagram illustrating a circuit configuration of the smartphone 2. Reference number 202 denotes the display section, which is formed of a color LCD and a driving circuit for driving the color LCD, for example. Reference number 212 denotes a display control section, which controls a display state of the display section 202. Reference number 213 denotes an input section, which is formed of various types of keys including a power source key not shown in FIG. 1. The input section 213 further includes a touch sensor over a surface of the color LCD of the display section 202 and a driving circuit for driving the touch sensor, the touch sensor allowing the display section 202 to function as a touch panel.

Reference number 214 denotes a CPU, which controls the entire functions of the smartphone 2. Reference number 215 denotes a program memory, in which a control program 2151, an application program 2152, and a pairing program 2153 are stored in advance.

The control program 2151 is a basic control program for allowing the CPU 214 to control the entire functions of the smartphone 2. The application program 2152 is formed of application programs for allowing the CPU 214 to carry out various types of processing including processing described later. The pairing program 2153 is a program for performing pairing (setting of connection) with the wrist information device 1, for example.

Reference number 216 denotes a built-in memory such as a flash memory, which stores various types of settings information used for determining the operational contents of the smartphone 2, and data of an electronic purse of an electronic purse function, for example.

Reference number 217 denotes a wireless I/F section, which executes receiving and transmitting with respect to the wrist information device 1 via Bluetooth. Reference number 219 denotes a communication I/F section for connecting the smartphone 2 to the Internet using a public network such as a wireless LAN.

Reference number 218 denotes an NFC I/F section including a loop antenna and a receiving/transmitting circuit, which can perform direct data communication for the electronic purse by contactless communication using the NFC technology with the payment terminal 3.

The smartphone 2 includes well-known circuits for performing sound communication and data communication, which are a sound input circuit that modulates and transmits an input sound, a transmitting circuit, a receiving circuit that receives a received sound signal, a regenerating circuit, a data transmitting/receiving circuit, and the like. The illustration and descriptions of those circuits will be omitted.

Next, the wrist information device 1, the smartphone 2, and the payment terminal 3 thus formed will be described with reference to FIG. 4 in terms of their operations relevant to the present invention.

Figure 4:
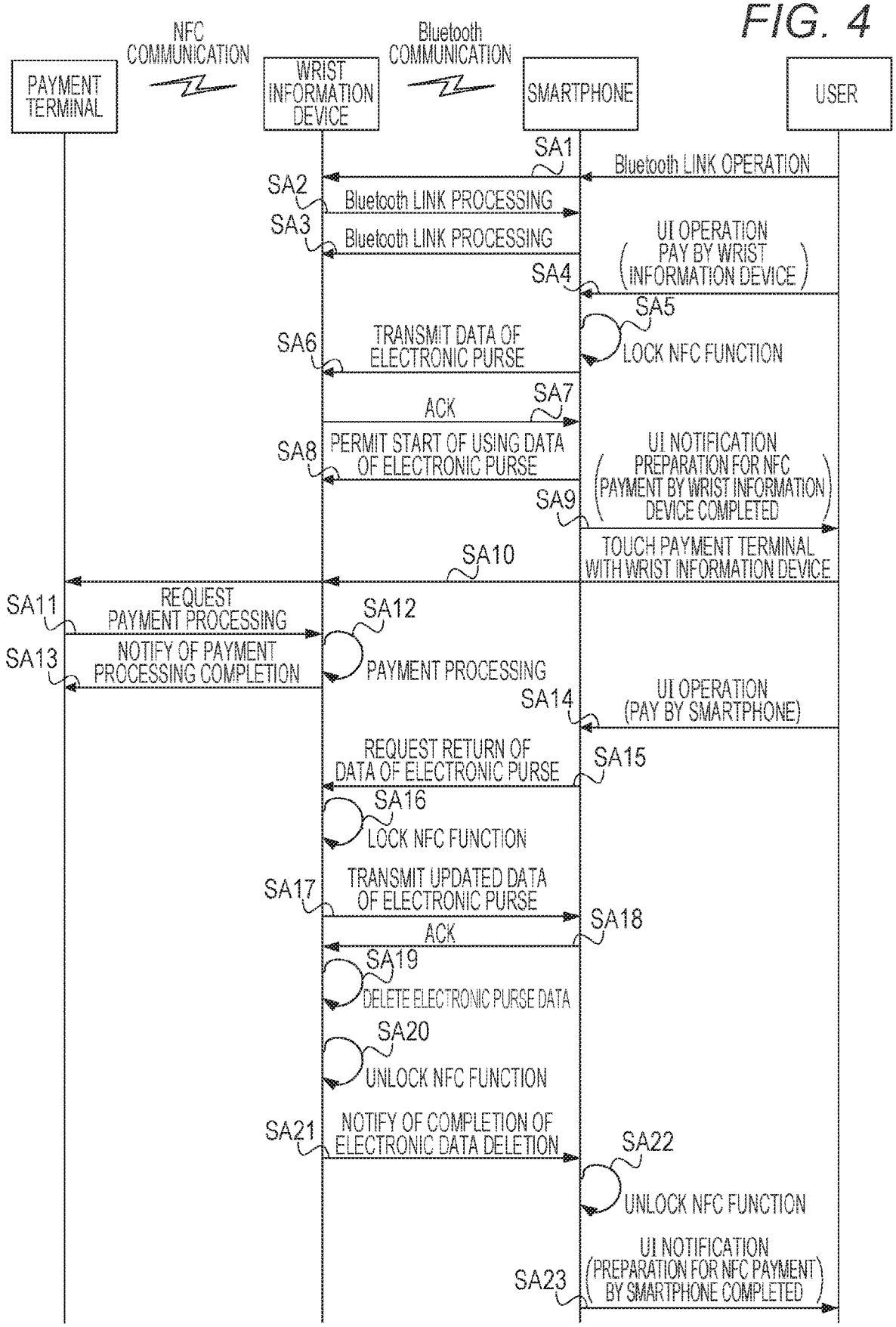
FIG. 4 is a sequence diagram illustrating a procedure under which a user makes an electronic payment with a payment terminal, using a wrist information device (information device) and a smartphone (mobile device) according to the first embodiment.

FIG. 4 is a sequence diagram illustrating a procedure under which a user makes an electronic payment with the payment terminal 3, using the wrist information device 1 and the smartphone 2. The wrist information device 1 is operated by execution of the control program 1151 and a predetermined application program 1152 by the CPU 114, and the smartphone 2 is operated by execution of the control program 2151 and a predetermined application program 2152 by the CPU 214.

The user carries out a predetermined operation on the wrist information device 1 and the smartphone 2 (SA1) and performs pairing for Bluetooth (SA2 and SA3). It is to be noted that other wireless or wire communications are applicable although the embodiment uses Bluetooth. The pairing is carried out by execution of the respective pairing programs 1153 and 2153 of the wrist information device 1 and the smartphone 2.

Further, the user performs an operation using the input section 213 of the smartphone 2 when putting the smartphone 2 into the user's bag, so that payment can be made with the wrist information device 1 using data of the electronic purse charged in the electronic purse function of the smartphone 2 (SA4). With the operation, the data of the electronic purse of the electronic purse function of the smartphone 2 is transmitted to the wrist information device 1 through a communication via Bluetooth (SA6), with the contactless communication function using the NFC technology of the smartphone 2 locked (SA5). During the contactless communication function is locked, direct payment by the contactless communication using the NFG technology of the smartphone 2 is not authorized.

The wrist information device 1 receives the data of the electronic purse from the smartphone 2 and returns ACK to the smartphone 2 (SA7). The smartphone 2 receives the ACK, notifies the wrist information device 1 of authorization for starting payment processing using the data of the electronic purse (SA8), and displays, to the user, in the display section 202, a notification stating that the preparation for payment processing with the wrist information device 1 has been completed (SA9).

Thereafter, the user uses the data of the electronic purse transferred to the wrist information device 1, in making payment. Specifically, in making payment, the user brings the information device 1 into contact with the payment terminal 3 so that a fare, for example, can be paid through a contactless communication using the NFC technology between the writs information device 1 and the payment terminal 3.

When the wrist information device 1 is brought into contact with the payment terminal 3 (SA10), the payment terminal 3 issues to the wrist information device 1 a request to perform payment processing for an amount according to a section travelled, for example (SA11), and the wrist information device 1 performs the payment processing by reducing the amount from the data of the electronic purse (SA12) and then notifies the payment terminal 3 of completion of the payment processing (SA13). In addition, it is reasonably possible to increase a charged amount by a charge operation as well.

On the other hand, if the user wants to apply the contactless communication function using the NFC technology of the smartphone 2, the user operates the smartphone 2 at the input section 213 so that payment can be made with the contactless communication function using the NFC technology of the smartphone 2 (SA14). With the operation, the smartphone 2 requests the wrist information device 1 to return the data of the electronic purse to the smartphone 2 (SA15). In response to the request, the wrist information device 1 locks the contactless communication function using the NFC technology of the wrist information device 1 so that the wrist information device 1 cannot be used for performing payment processing using the data of the electronic purse (SA16), and transmits the data of the electronic purse to the smartphone 2 (SA17). The data of the electronic purse to be transmitted is updated data reflecting amounts having been paid or charged by the wrist information device 1.

The smartphone 2 receives the data of the electronic purse from the wrist information device 1, and returns ACK to the wrist information device 1 in order to notify the wrist information device 1 of the receiving (SA18). The wrist information device 1 receives the ACK and deletes the data of the electronic purse from the wrist information device 1 (SA19) and unlocks the contactless communication function using the NFC technology of the wrist information device 1 (SA20). Subsequently, the wrist information device 1 notifies the smartphone 2 of the deletion of the data of the electronic purse from the wrist information device 1 (SA21).

Upon receipt of the notification, the smartphone 2 unlocks the contactless communication function using the NFC technology (SA22), and displays, to the user, in the display section 202, a notification stating that the preparation for direct payment processing with the smartphone 2 through the contactless communication using the NFC technology has been completed (SA23).

The procedure set forth above enables the user to make payment via the payment terminal 3 with the wrist information device 1, using the money charged in the electronic purse function of the smartphone 2.

Second Embodiment

The first embodiment achieves the payment processing that can be done with the wrist information device 1 by transmitting to the wrist information device 1 the data of the electronic purse held by the electronic purse function of the smartphone 2. In contrast, the second embodiment achieves payment processing that can be done by contactless communication using the NFC technology by the wrist information device 1, without the need of transmitting to the wrist information device 1 the data of the electronic purse of the smartphone 2.

The method according to the second embodiment makes it possible to perform payment processing using the data of the electronic purse held by the electronic purse function of the smartphone 2 in both cases where a contactless communication using the NFC technology installed in the smartphone 2 is employed for the payment processing and a contactless communication using the NFC technology installed in the wrist information device 1 is employed for the payment processing.

As in the first embodiment, the electronic payment system according to the second embodiment is formed of the wrist information device 1 and the smartphone 2 capable of data exchange between each other via Bluetooth shown in FIG. 1, and the payment terminal 3 that makes payment of data of the electronic purse held by the electronic purse function of the smartphone 2. The operations relevant to the payment processing according to the second embodiment will be described below with reference to FIG. 5.

Figure 5:
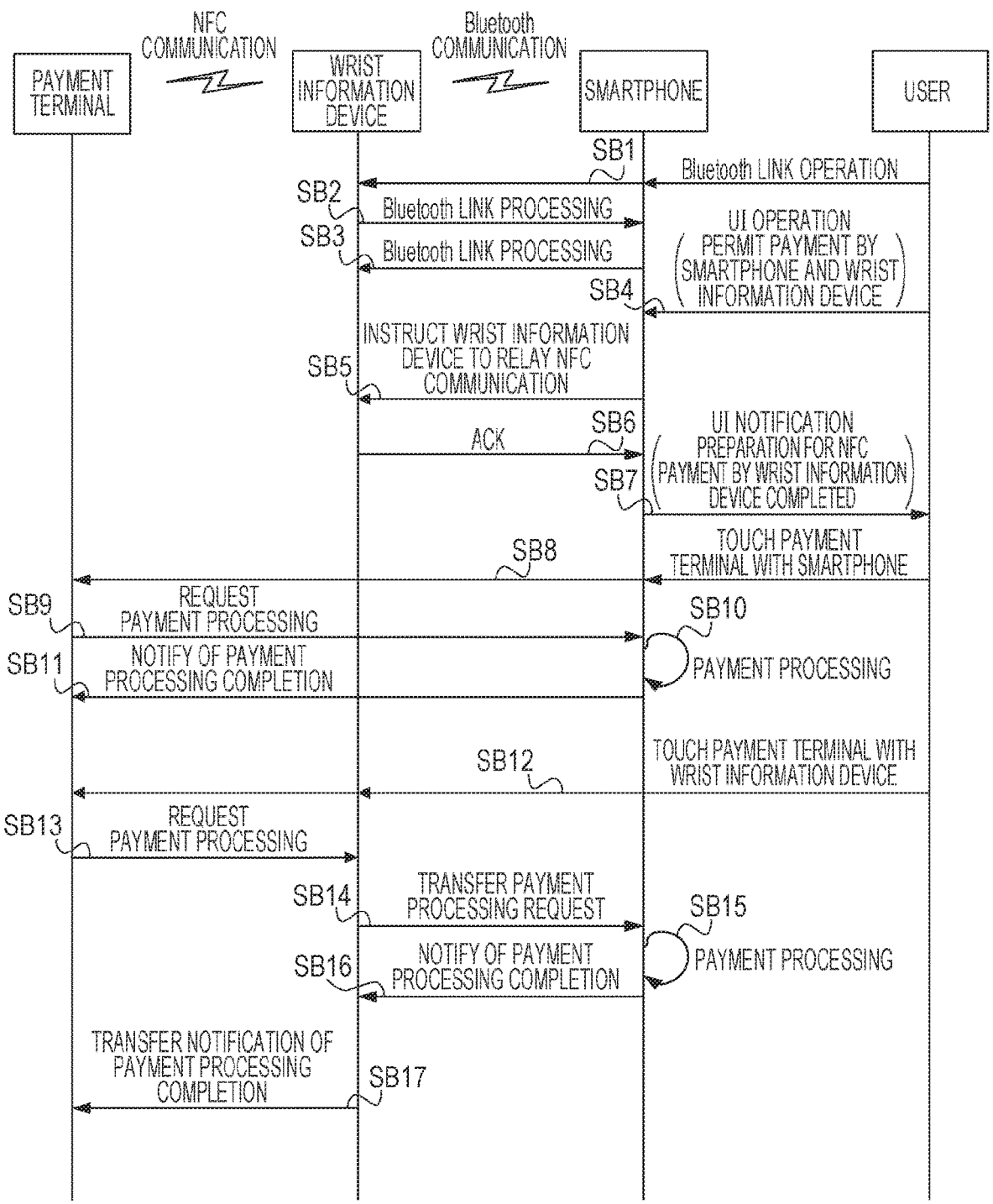
FIG. 5 is a sequence diagram illustrating a procedure under which a user makes an electronic payment with a payment terminal, using a wrist information device (information device) and a smartphone (mobile device) according to a second embodiment.

FIG. 5 is a sequence diagram illustrating a procedure according to the second embodiment under which a user makes payment with the payment terminal 3, using the wrist information device 1 and the smartphone 2. The wrist information device 1 is operated by execution of the control program 1151 and a predetermined application program 1152 by the CPU 114, and the smartphone 2 is operated by execution of the control program 2151 and a predetermined application program 2152 by the CPU 214.

As in the first embodiment, a user carries out a predetermined operation on the wrist information device 1 and the smartphone 2 (SB1) and performs pairing for Bluetooth (SB2 and SB3). It is to be noted that other wireless or wire communications are applicable although the embodiment uses Bluetooth. The pairing is carried out by execution of the respective pairing programs 1153 and 2153 of the wrist information device 1 and the smartphone 2.

Further, the user performs an operation using the input section 213 of the smartphone 2 so that payment can be made in both cases where a contactless communication using the NFC technology installed in the smartphone 2 is employed for the payment processing and a contactless communication using the NFC technology installed in the wrist information device 1 is employed for the payment processing (SB4). With the operation, the smartphone 2 issues a relay instruction to the wrist information device 1 through communication via Bluetooth, the relay instruction demanding relaying, at the wrist information device 1, the data of the electronic purse to be transmitted from the smartphone 2 to the wrist information device 1 by communication via Bluetooth, and then performing payment processing with the payment terminal 3 through a contactless communication using the NFC technology installed in the wrist information device 1 (SB5).

The wrist information device 1 receives the relay instruction from the smartphone 2 and returns ACK to the smartphone 2 (SB6). The smartphone 2 receives the ACK and displays in the display section 202 a notification stating that the preparation for the payment processing according to second embodiment has been completed (SB7).

A case will be described next where a user makes payment as usual through a contactless communication using the NFC technology installed in the smartphone 2 in the above state. This case is the same as the usual payment processing through a contactless communication using the NFC technology installed in the smartphone 2. Specifically, payment processing is performed through a contactless communication using the NFC technology in the smartphone 2, in a manner such that the smartphone 2 is brought into contact with the payment terminal 3.

When the smartphone 2 is brought into contact with the payment terminal 3 by the user (SB8), the payment terminal 3 issues to the smartphone 2 a request to perform payment processing for an amount according to a section travelled, for example (SB9). The smartphone 2 performs payment processing by reducing the amount from the data of the electronic purse of the electronic purse function (SB10) and sends a notification of payment processing completion to the payment terminal 3 (SB11).

On the other hand, the following is the processing to be carried out if the user intends to perform payment processing using the data of the electronic purse of the electronic purse function of the smartphone 2 via a contactless communication using the NFC technology in the wrist information device 1.

First, when the user touches the payment terminal 3 with the wrist information device 1 (SB12), the payment terminal 3 issues to the wrist information device 1 a request to perform payment processing for an amount according to a section travelled, for example (SB13). The wrist information device 1 transfers the received request directly to the smartphone 2 through communication via Bluetooth (SB14). The smartphone 2 receives the transferred request and reduces the amount from the data of the electronic purse of its electronic purse function in the payment processing (SB15). When the payment processing is completed, the smartphone 2 sends a notification of the payment processing completion to the wrist information device 1 through communication via Bluetooth (SB16). The wrist information device 1 directly transfers the notification of the payment processing completion to the payment terminal 3 through a contactless communication using the NFC technology installed in the wrist information device 1 (SB17). In this way, a series of processing is ended.

In the meanwhile, although in second embodiment, an example has been described in which a user can employ at one time contactless communications using the NFC technology installed in both the smartphone 2 and the wrist information device 1, the contactless communication may be configured so as to use the NFC technology installed in one of the smartphone 2 and the wrist information device 1 at one time.

Modified Example of Second Embodiment

Figure 6:
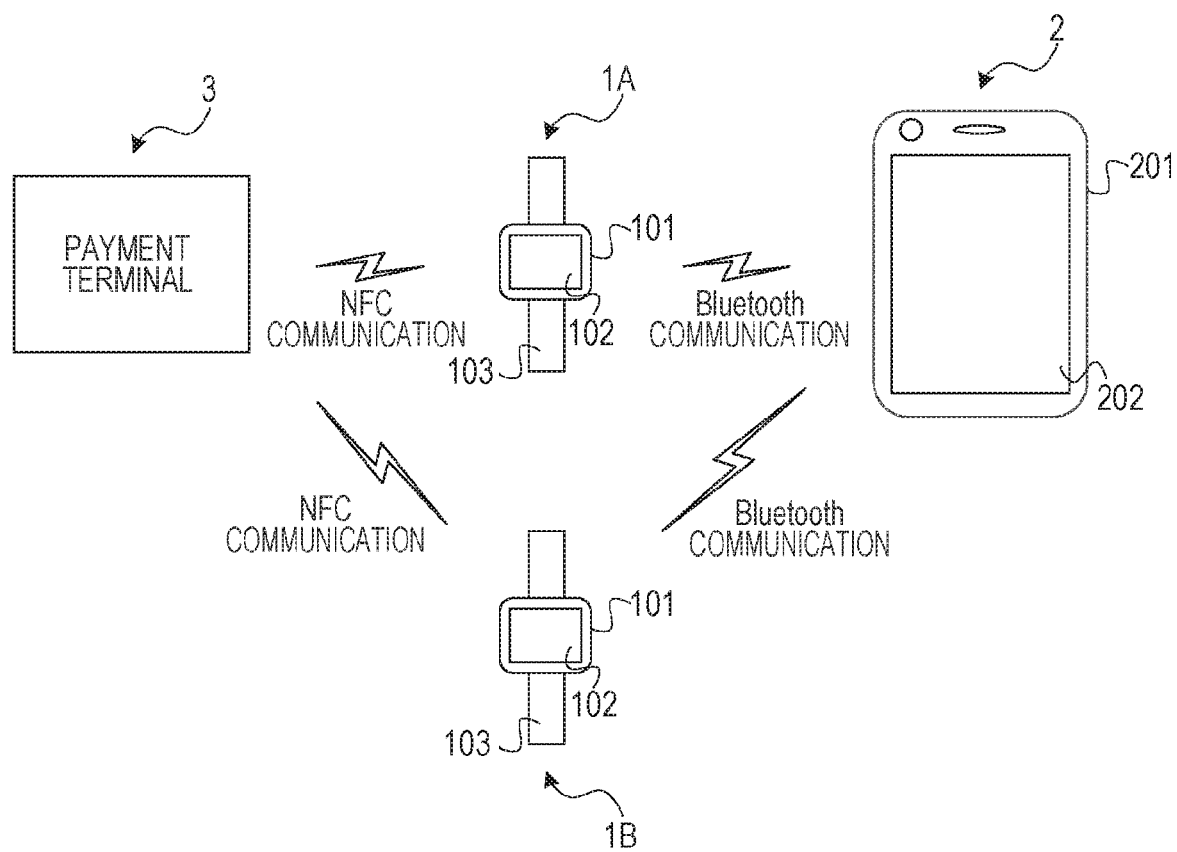
FIG. 6 is a configuration diagram illustrating a configuration of an electronic payment system in a modified example of the second embodiment.

According to the mechanism of the second embodiment, it is possible to perform payment processing using the data of the electronic purse of the electronic purse function of a single smartphone when there are more than one wrist information device, as shown in FIG. 6. In the case of a married couple, for example, if a wife and a husband have wrist information devices 1A and 1B, respectively, payment processing is possible with the wrist information devices 1A and 1B of the couple, using the data of the electronic purse of the electronic purse function of the husband's smartphone 2.

As described above, the first and second embodiments relate to methods for money payment processing. The methods allow us as well to go though an entrance gate of an amusement park by touching the entrance gate with a wrist information device, for example, using information of an electronic admission ticket purchased by a smartphone.

[Prevention of Skimming]

Third Embodiment

Figure 7:
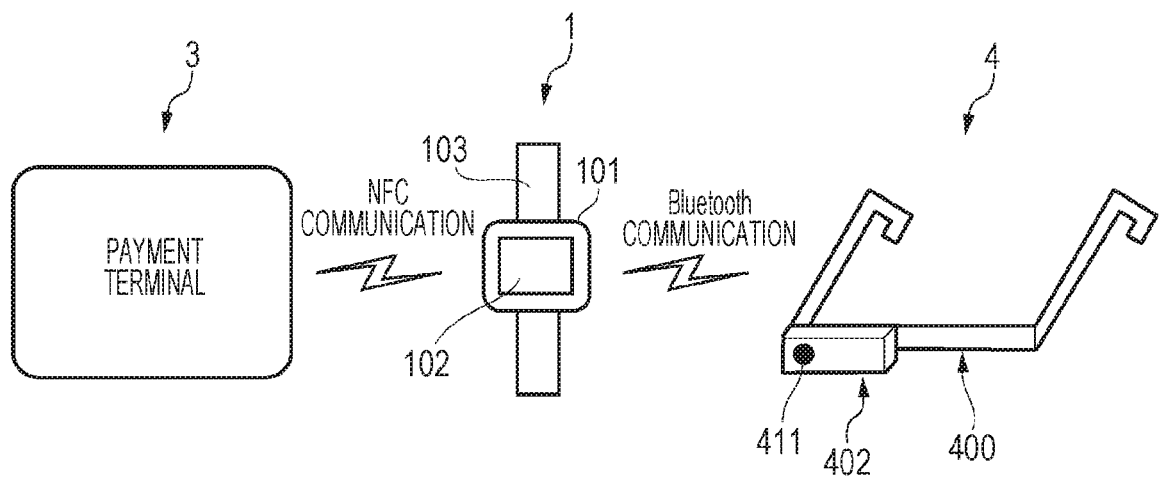
FIG. 7 is a configuration diagram illustrating a skimming prevention system according to a third embodiment.

FIG. 7 is a configuration diagram illustrating a skimming prevention system according to a third embodiment. The system according to the third embodiment is formed of the wrist information device 1 and a head-mounted display (HMD) 4 capable of data exchange between each other via Bluetooth, and the payment terminal 3 that makes payment of data with the wrist information device 1.

Although the wrist information device 1 has the same configuration as that in the first embodiment, the application program 1152 in the third embodiment includes terminal identifying information to be used when the wrist information device 1 is recognized by a publicly-known image recognition technique in an image of the wrist information device 1 taken by the head-mounted device 4. The examples of the terminal identifying information include feature data indicating the color, shape, and the like. of the wrist information device 1.

In addition, the pairing program 1153 includes a program for performing pairing (setting of connection) for Bluetooth with the head-mounted device 4, for example, and the built-in memory 116 stores an ID number unique to the wrist information device 1 for use in an electronic payment.

Further, the wireless I/F section 117 conducts data communication via Bluetooth with the head-mounted device 4.

The payment terminal 3 has the same configuration as that in the first embodiment and the descriptions thereof will be thus omitted.

The head-mounted display (hereinafter referred to as HMD) 4 is a wearable information device that a user can wear on the head, for example, and displays a virtual image within the field of view of the user without blocking the field of view.

Moreover, the HMD 4 is formed of a main body 400 in the shape of glasses, and a display section 402 at one side of the main body 400 provided to locate within the vision of the right eye of a user for displaying the image within the field of view of the user. Further, the display section 402 is provided with a camera section 411 for taking an image of an object in the direction of line of vision of the user.

Figure 8:
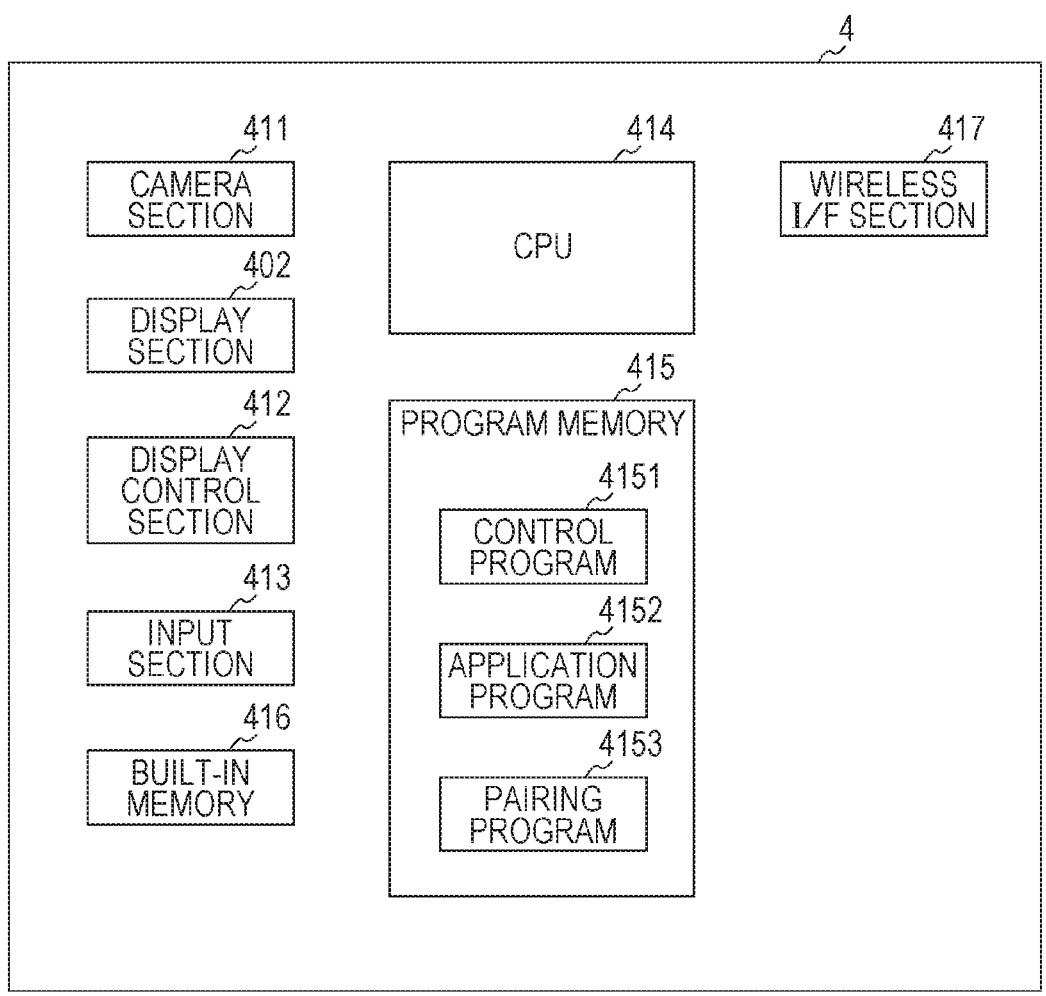
FIG. 8 is a block diagram illustrating a head-mounted display (wearable information device)

FIG. 8 is a schematic block diagram illustrating a circuit configuration of the HMD 4.

The display section 402 is formed of a light source such as an LED, a transmissive liquid crystal display element that displays an image based on image data, and a driving circuit for the display element. Although not shown in the drawings, in the display section 402, an optical system is included that has a projector lens for adjusting the size of an image displayed in the liquid crystal display element, and a light guide plate containing a half mirror layer. Further, a light emitted from the light source is converted into a projection light by the liquid crystal display element and is projected on the half mirror layer within the light guide plate through the projector lens, so that the display section 402 displays a picture as a virtual image in the vision of a user without blocking the vision of the user in the region of the right eye.

The camera section 411 includes an image taking element such as a CMOS (complementary metal oxide semiconductor) type or a CCD (charge coupled device), and a signal processing circuit that generates taken-image data based on an image taking signal obtained by the image taking element, for example.

The display control section 412 controls the displays of pictures by the display section 402. The input section 413 includes different types of switches not shown in FIG. 7.

The CPU 414 controls the entire functions of the HMD 4. The program memory 415 stores a control program 4151, an application program 4152, and a pairing program 4153 in advance.

The control program 4151 is a basic control program for allowing the CPU 414 to control the entire functions of the HMD 4. The application program 4152 is formed of application programs for allowing the CPU 414 to carry out various types of processing including processing described later. The pairing program 4153 is a program for performing pairing (setting of connection) for Bluetooth with the wrist information device 1, for example.

A built-in memory 416 is a flash memory, for example, which stores various types of settings information used for determining the operational contents of the HMD 4, taken-image data of an object captured by the camera section 411, and registration information on at least one wrist information device 1 and other different types of information devices previously registered by the pairing.

The information of the registration information, which relates to the at least one wrist information device 1, includes the terminal identifying information used for identifying a registered wrist information device 1 in an image taken of the registered wrist information device 1, the terminal identifying information being stored in the built-in memory 416 so as to correspond to ID data for individual identification of the registered wrist information device 1.

A wireless I/F section 417 executes data communication with the wrist information device 1, for example, via Bluetooth.

Next, the wrist information device 1 and the HMD 4 thus formed will be described in terms of their operations relevant to the present invention.

Figure 9:
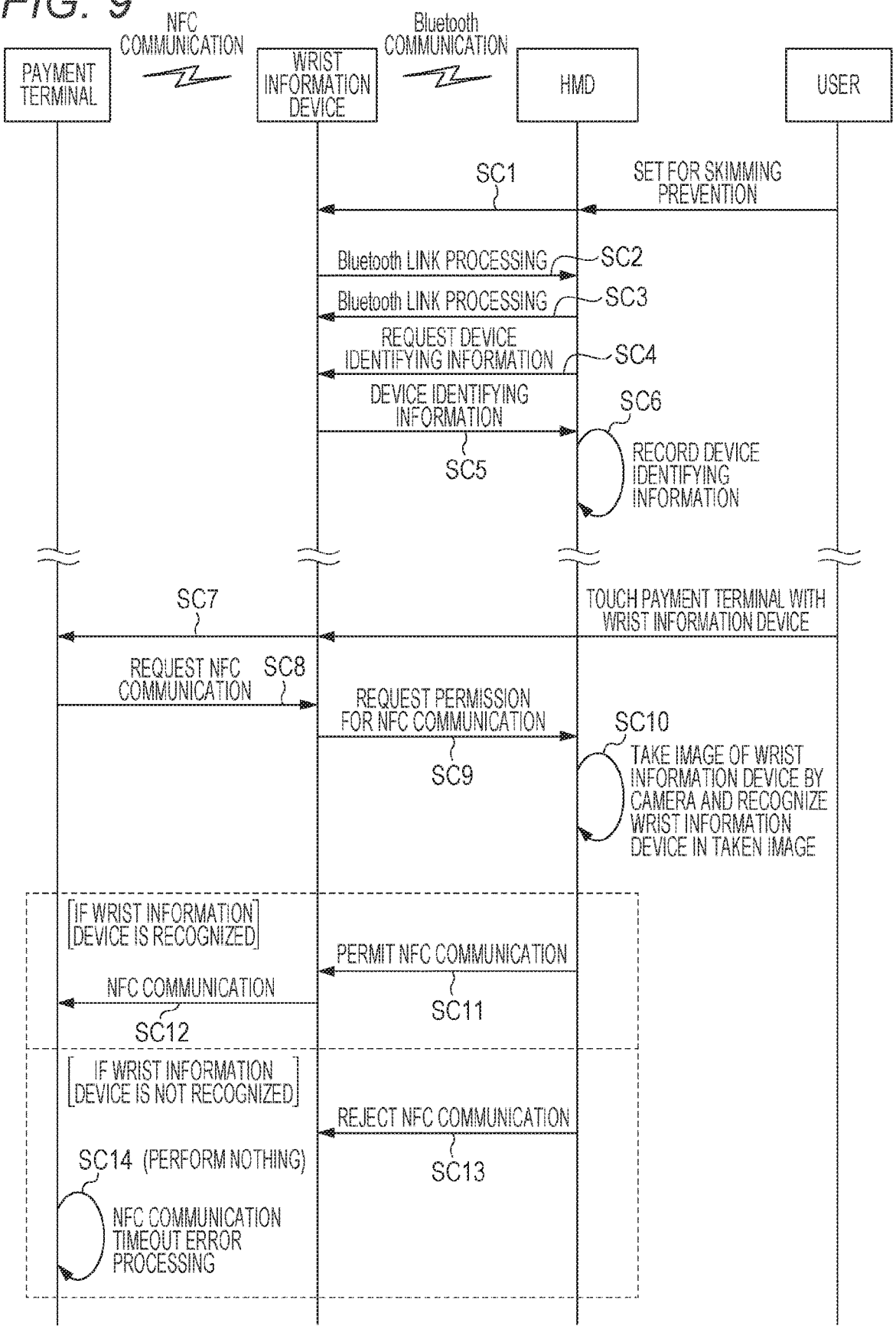
FIG. 9 is a sequence diagram illustrating a procedure under which a user makes an electronic payment with a payment terminal, using a wrist information device (information device) and a head-mounted display (wearable information device) according to the third embodiment.

FIG. 9 is a sequence diagram illustrating the contents of operations performed by the wrist information device 1 and the HMD 4 when a user uses the skimming prevention system according to the third embodiment. More specifically, FIG. 9 illustrates the contents of operations performed in a manner such that the CPU 114 executes the programs stored in the program memory 115 in the wrist information device 1 and the CPU 414 executes the programs stored in the program memory 415 in the HMD 4.

First, a user performs a predetermined setting operation (SC1) on the wrist information device 1 and the HMD 4 in using the skimming prevention system according to the third embodiment.

With the operation SC1, Blouetooth linking processing (publicly-known pairing processing) is performed between the wrist information device 1 and the HMD 4 (SC2 and SC3) so that data communication is enabled between the wrist information device 1 and the HMD 4.

Subsequently, the HMD 4 requests the terminal identifying information for the terminal from the wrist information device 1 (SC4). In response to the request, the wrist information device 1 sends the terminal identifying information to the HMD 4 (SC5). The HMD 4 receives the terminal identifying information, and then stores the information in the built-in memory 416 so that the information corresponds to the ID data of the wrist information device 1 obtained by the pairing processing (SC6). In this way, measures have been taken against skimming.

Figure 10A:
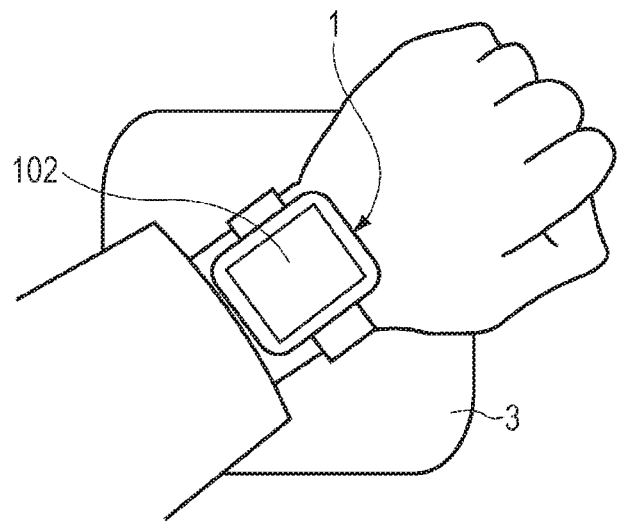
FIG. 10A is an explanation diagram illustrating a state in which an electronic payment according to the third embodiment is implemented.

Thereafter, when the user touches the payment terminal 3 with the wrist information device 1 as shown in FIG. 10A (or passes the wrist information device 1 over the payment terminal 3) (SC7), the payment terminal 3 issues an NFC communication request to the wrist information device 1 (SC8).

The wrist information device 1 receives the NFC communication request and issues an NFC communication permission request to the HMD 4 (SC9). In other words, the wrist information device 1 sends an inquiry to the HMD 4 about the permission for execution of the NFC communication.

After receiving the inquiry, the HMD 4 recognizes the information device 1 by taking an image of an object in the direction of line of vision of the user with the camera section 411 and performing recognition processing on the image using the terminal identifying information having been acquired from the wrist information device 1 and stored in the HMD 4 in advance (SC10). In other words, the HMD 4 determines whether or not the taken image shows the object, which is the wrist information device 1 having issued the NFC communication permission request.

In the meanwhile, the image-taking for the object may be routinely conducted while the skimming prevention system is being used.

The HMD 4 repeats the above processing within a period of time set in advance. More specifically, if the wrist information device 1 cannot be recognized in the beginning of the processing or after the beginning of the processing, the image-taking is repeatedly conducted at fixed intervals within the predetermined period of time, with the recognition processing sequentially performed on the taken images.

Figure 10B:
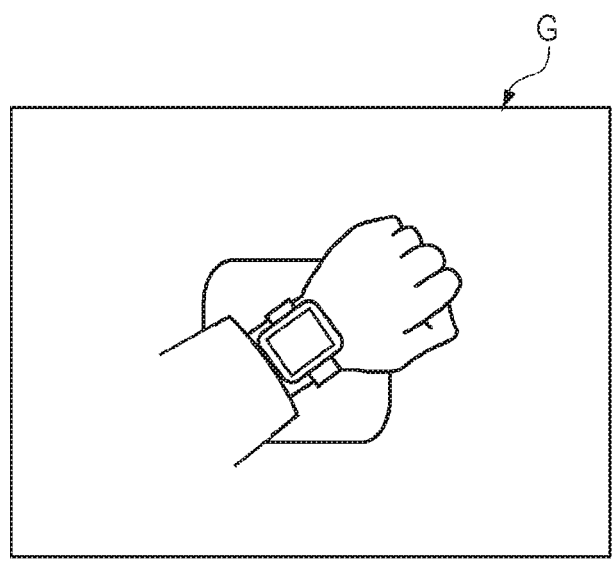
FIG. 10B is an explanation diagram illustrating an example of an image taken by a head-mounted display (wearable information device).

Further, if the HMD 4 can obtain a taken image G as shown in FIG. 10B before the elapse of the predetermined period of time and the wrist information device 1 can be recognized in the taken image G, the HMD 4 issues an NFC communication permission to the wrist information device 1 (SC11). In other words, the wrist information device 1 receives permission for NFC communication from the HMD 4.

If the wrist information device 1 receives the NFC communication permission, it performs NFC communication responding to a request from the payment terminal 3, which is transmitting of an ID number unique to the wrist information device 1, balance data, etc. (SC12). In this way, various types of electronic payments are made.

On the other hand, if the HMD 4 cannot recognize in the taken images the wrist information device 1 having issued the NFC communication permission request within the predetermined period of time, the HMD 4 sends an NFC communication rejection to the wrist information device 1 (SC13). In other words, the HMD 4 determines that there is a possibility of skimming performed and makes a reply to the wrist information device 1 to the effect that the NFC communication must not be made.

If the wrist information device 1 receives the NFC communication rejection, it makes no reply to a request from the payment terminal 3 and discontinues the subsequent NFC communication with the payment terminal 3. Thus, the payment terminal 3 cannot receive a reply from the wrist information device 1 within the predetermined period of time, and performs timeout error processing for the NFC communication to end the NFC communication.

As described above, in the skimming prevention system according to the third embodiment, if no image has been taken by the HMD 4 of the wrist information device 1 when the NFC communication permission request is received from the wrist information device 1 or within the predetermined period of time, the subsequent NFC communication between the wrist information device 1 and the payment terminal 3 is automatically discontinued.

If the user intends to voluntarily touch the payment terminal 3 with the wrist information device 1, the user is usually looking at the wrist information device 1. An image of the wrist information device 1 is taken by the HMD 4 when the user is looking at the wrist information device 1 or within the predetermined period of time.

In contrast, if the payment terminal 3 becomes in contact with the wrist information device 1 before the user knows it, that is, if skimming is attempted on the wrist information device 1, no images has been taken of the wrist information device 1 by the HMD 4 within the predetermined period of time because the user has not been looking at the wrist information device 1. In that case, the wrist information device 1 discontinues the subsequent NFC communication with the payment terminal 3 so that the skimming can be prevented without fail.

In this way, when a user uses the electronic purse function of the wrist information device 1, the user can make an electronic payment only by turning the user's face toward the wrist information device 1, which can prevent skimming without fail.

For the advantages set forth above, the skimming prevention system according to the third embodiment enables the wrist information device to attain high security performances without reducing the convenience.

In the third embodiment, the terminal identifying information used when the HMD 4 recognizes the registered wrist information device 1 in a taken image is the information prepared in advance in the wrist information device 1. The terminal identifying information may be information obtained as needed by taking an image of the wrist information device 1 at registration thereof and analyzing the taken image.

Further, in the third embodiment, the registered wrist information device 1 itself is recognized in a taken image. In other words, the presence or absence of the wrist information device 1 in a taken image is determined by a so-called object recognition. The methods for recognizing the wrist information device applicable to the present invention are not limited to the above method.

For example, the presence or absence of the wrist information device 1 in a taken image may be determined by equipping the wrist information device 1 with a LED and using a visible light communication. Alternatively, the presence or absence of the wrist information device 1 in a taken image may be determined by allowing the display section 102 of the wrist information device 1 to display a predetermined identification image (two-dimensional bar code, for example) when the payment terminal 3 transmits a NFC communication request, for example, and recognizing the identification image. The identification image may be an image prepared in advance in the wrist information device 1 or an image that the HMD 4 automatically allocated to the wrist information device 1 at registration thereof and supplied to the wrist information device 1.

Moreover, in addition to the configurations described in the third embodiment, a configuration may be employed in which the HMD 4 constantly displays in the field of view of a user the progress of electronic payments with the NFC technology with the wrist information device 1, for example. With the configuration, the user can be instantly notified of attempted skimming to the wrist information device 1, and this leads to ensuring of higher security performances.

Further, much higher security performances can be ensured by permitting the NFC communication not only when the HMD 4 can recognize the wrist information device 1 in a taken image but also when the HMD 4 can recognize a user's specific gesture determined in advance within the angle of view of the HMD 4 (camera section 411) or when a predetermined switching operation is performed in the HMD 4 in parallel with the recognition of the wrist information device 1 in a taken image.

Furthermore, although the third embodiment employs the HMD 4 as the wearable information device of the skimming prevention system, the wearable information device in the present invention is not particularly limited as long as the wearable information device is configured to be able to take an image of an object in the direction of line of vision of a user when receiving the NFC communication permission request from the wrist information device 1. In the implementation of the present invention, not only the HMD 4 but also any other wearable information devices may be adequately used.

Moreover, although the third embodiment employs the wrist information device 1 as the information device of the skimming prevention system, the information device applicable to the present invention is not particularly limited as long as the information device is configured to be able to read stored data by contactless communication. The present invention is advantageous for preventing skimming to any information devices other than the wrist information device 1, such as a ring-shaped wearable information device, and further, not limiting wearable information device, a mobile phone and a smartphone with the electronic purse function.

In addition, although the data as the target of skimming prevention in the wrist information device 1 in the third embodiment is data for use in an electronic payment, any other types of data may be the target of skimming prevention as long as the data can be found by contactless communication in accordance with a freely selected standard.

The data which can be found by contactless communication includes vital information and action history data, the vital information being obtained when the wrist information device 1 has a function of acquiring and storing vital information indicating the physical states of a user and the action history data being obtained when the wrist information device 1 has a function of acquiring and storing action history data (GPS information, for example) indicating the action history of a user.

In the third embodiment, if no image has been taken by the HMD 4 of the wrist information device 1 when the NFC communication permission request is received from the wrist information device 1 or within the predetermined period of time, the subsequent NFC communication between the wrist information device 1 and the payment terminal 3 is automatically discontinued so that skimming prevention is implemented. In addition to the above skimming prevention, the wrist information device 1 may be controlled so that the wrist information device 1 cannot carry out its functions if the HMD 4 has not taken an image of the wrist information device 1. For example, the display section 102 of the wrist information device 1 may be turned off if the HMD 4 has not taken an image of the wrist information device 1.

While certain embodiments and modified examples have been described, various changes may be made within the range in which the advantages of the present invention can be ensured. The embodiments after the changes fall within the scope of the invention described in the accompanying claims and the equivalent thereof.

What is claimed is:

1. A wearable information device comprising:
a wearable information device-side processor configured to:
   control a wearable information device-side wireless communication interface to receive information about an amount of money from a mobile device, and control a memory to store the information about the amount of money received;
   control the wearable information device-side wireless communication interface to perform a communication with a payment terminal and update the information about the amount of money stored in the memory to perform payment processing;
   control the wearable information device-side wireless communication interface to receive a request from the mobile device to transmit the information about the amount of money stored in the memory that has been updated;
   in response to receiving the request from the mobile device to transmit the information about the amount of money stored in the memory that has been updated,
      control the wearable information device-side wireless communication interface to prevent performance of another communication by the wearable information device-side communication interface with the payment terminal; and
      control the wearable information device-side wireless communication interface to transmit the information about the amount of money stored in the memory that has been updated to the mobile device; and
   after controlling the wearable information device-side wireless communication interface to transmit the information about the amount of money stored in the memory that has been updated to the mobile device, control the memory so that the information about the amount of money stored in the memory that has been updated cannot be used to perform another payment processing.

2. The wearable information device according to claim 1, wherein the wearable information device-side processor is configured to:
   control the wearable information device-side wireless communication interface to communicate with the payment terminal to receive a request from the payment terminal to perform the payment processing; and
   in response to receiving the request from the payment terminal to perform the payment processing, update the information about the amount of money stored in the memory to perform the payment processing.

3. The wearable information device according to claim 1, wherein the wearable information device-side processor is configured to control the wearable information device-side wireless communication interface to perform a communication with the payment terminal to transmit a notification to the payment terminal to notify the payment terminal of performance of the payment processing.

4. The wearable information device according to claim 1, further comprising attachments configured attach the wearable information device to a wrist.

5. The wearable information device according to claim 1, further comprising the wearable information device-side wireless communication interface, wherein the wearable information device-side wireless communication interface comprises:
- a first communication interface configured to perform communication with the payment terminal by contactless communication; and
- a second communication interface configured to perform communication with the mobile device by wireless communication which is different from contactless communication.

6. A system comprising:
a mobile device; and
a wearable information device comprising:
- a wearable information device-side processor configured to:
  - control a wearable information device-side wireless communication interface to receive information about an amount of money from the mobile device, and control a memory to store the information about the amount of money received;
  - control the wearable information device-side wireless communication interface to perform a communication with a payment terminal and update the information about the amount of money stored in the memory to perform payment processing;
  - control the wearable information device-side wireless communication interface to receive a request from the mobile device to transmit the information about the amount of money stored in the memory that has been updated;
  - in response to receiving the request from the mobile device to transmit the information about the amount of money stored in the memory that has been updated,
    - control the wearable information device-side wireless communication interface to prevent performance of another communication by the wearable information device-side communication interface with the payment terminal; and
    - control the wearable information device-side wireless communication interface to transmit the information about the amount of money stored in the memory that has been updated to the mobile device; and
  - after controlling the wearable information device-side wireless communication interface to transmit the information about the amount of money stored in the memory that has been updated to the mobile device, control the memory so that the information about the amount of money stored in the memory that has been updated cannot be used to perform another payment processing.

7. The system according to claim 6,
wherein the mobile device comprises a mobile device-side processor configured to:
- receive a first instruction; and
- in response to receiving the first instruction, control a mobile device-side wireless communication interface to transmit the information about the amount of money to the wearable information device.

8. The system according to claim 7,
wherein the mobile device-side processor is configured to, in response to receiving the first instruction, control the mobile device-side wireless communication interface to prevent performing of communication by the mobile device-side wireless communication interface with the payment terminal.

9. The system according to claim 6,
wherein the wearable information device-side processor is configured to control the wearable information device-side wireless communication interface to transmit a notification to the mobile device to notify the mobile device of completion of controlling the memory so that the information about the amount of money stored in the memory that has been updated cannot be used to perform another payment processing, and
wherein the mobile device comprises a mobile device-side processor configured to:
- control a mobile device-side wireless communication interface to receive the notification from the wearable information device; and
- in response to receiving the notification from the wearable information device, control the mobile device-side wireless communication interface to permit performing of communication by the mobile device-side wireless communication interface with the payment terminal.

10. A method for operating a wearable device, the method comprising:
- controlling a wearable information device-side wireless communication interface to receive information about an amount of money from a mobile device, and controlling a memory to store the information about the amount of money received;
- controlling the wearable information device-side wireless communication interface to perform a communication with a payment terminal and updating the information about the amount of money stored in the memory to perform payment processing;
- controlling the wearable information device-side wireless communication interface to receive a request from the mobile device to transmit the information about the amount of money stored in the memory that has been updated;
- in response to receiving the request from the mobile device to transmit the information about the amount of money stored in the memory that has been updated,
  - controlling the wearable information device-side wireless communication interface to prevent performance of another communication by the wearable information device-side communication interface with the payment terminal; and
  - controlling the wearable information device-side wireless communication interface to transmit the information about the amount of money stored in the memory that has been updated to the mobile device; and
- after controlling the wearable information device-side wireless communication interface to transmit the information about the amount of money stored in the memory that has been updated to the mobile device, controlling the memory so that the information about the amount of money stored in the memory that has been updated cannot be used to perform another payment processing.

11. A non-transitory computer-readable storage device storing instructions for operating a wearable device, wherein the instructions cause a computer to at least perform:
- controlling a wearable information device-side wireless communication interface to receive information about an amount of money from a mobile device, and controlling a memory to store the information about the amount of money received;

controlling the wearable information device-side wireless communication interface to perform a communication with a payment terminal and updating the information about the amount of money stored in the memory to perform payment processing;

controlling the wearable information device-side wireless communication interface to receive a request from the mobile device to transmit the information about the amount of money stored in the memory that has been updated;

in response to receiving the request from the mobile device to transmit the information about the amount of money stored in the memory that has been updated,
- controlling the wearable information device-side wireless communication interface to prevent performance of another communication by the wearable information device-side communication interface with the payment terminal; and
- controlling the wearable information device-side wireless communication interface to transmit the information about the amount of money stored in the memory that has been updated to the mobile device; and after controlling the wearable information device-side wireless communication interface to transmit the information about the amount of money stored in the memory that has been updated to the mobile device, controlling the memory so that the information about the amount of money stored in the memory that has been updated cannot be used to perform another payment processing.

\* \* \* \* \*